June 12, 1951  F. J. MEHRING  2,557,006
WALKING TRACTOR OR TILLER HITCH
Filed April 19, 1948  2 Sheets-Sheet 1
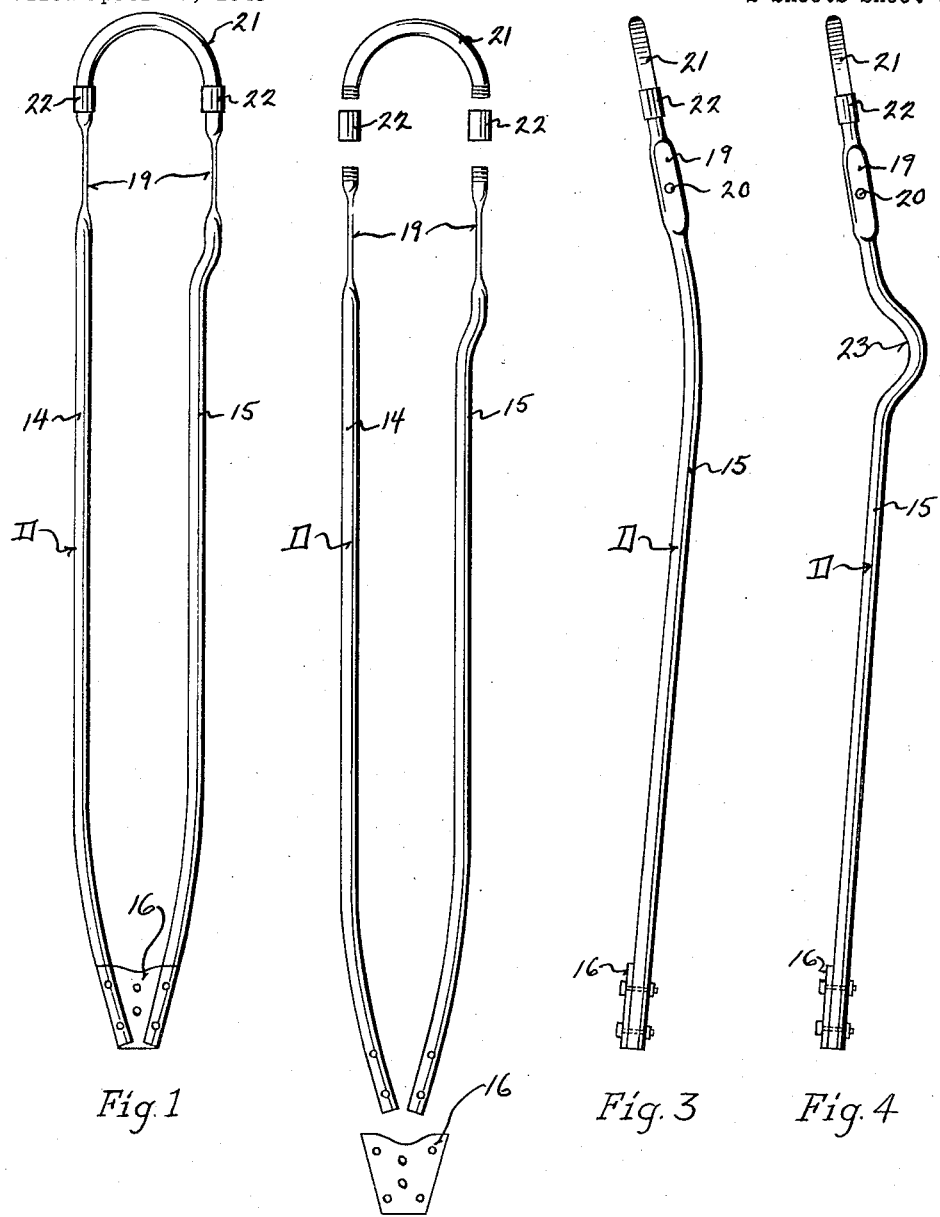
Fig. 1    Fig. 2    Fig. 3    Fig. 4
Fig. 5
INVENTOR
FREDERICK J. MEHRING
BY 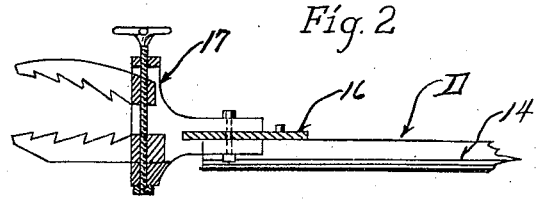
ATTORNEYS June 12, 1951 F. J. MEHRING 2,557,006
WALKING TRACTOR OR TILLER HITCH
Filed April 19, 1948 2 Sheets-Sheet 2
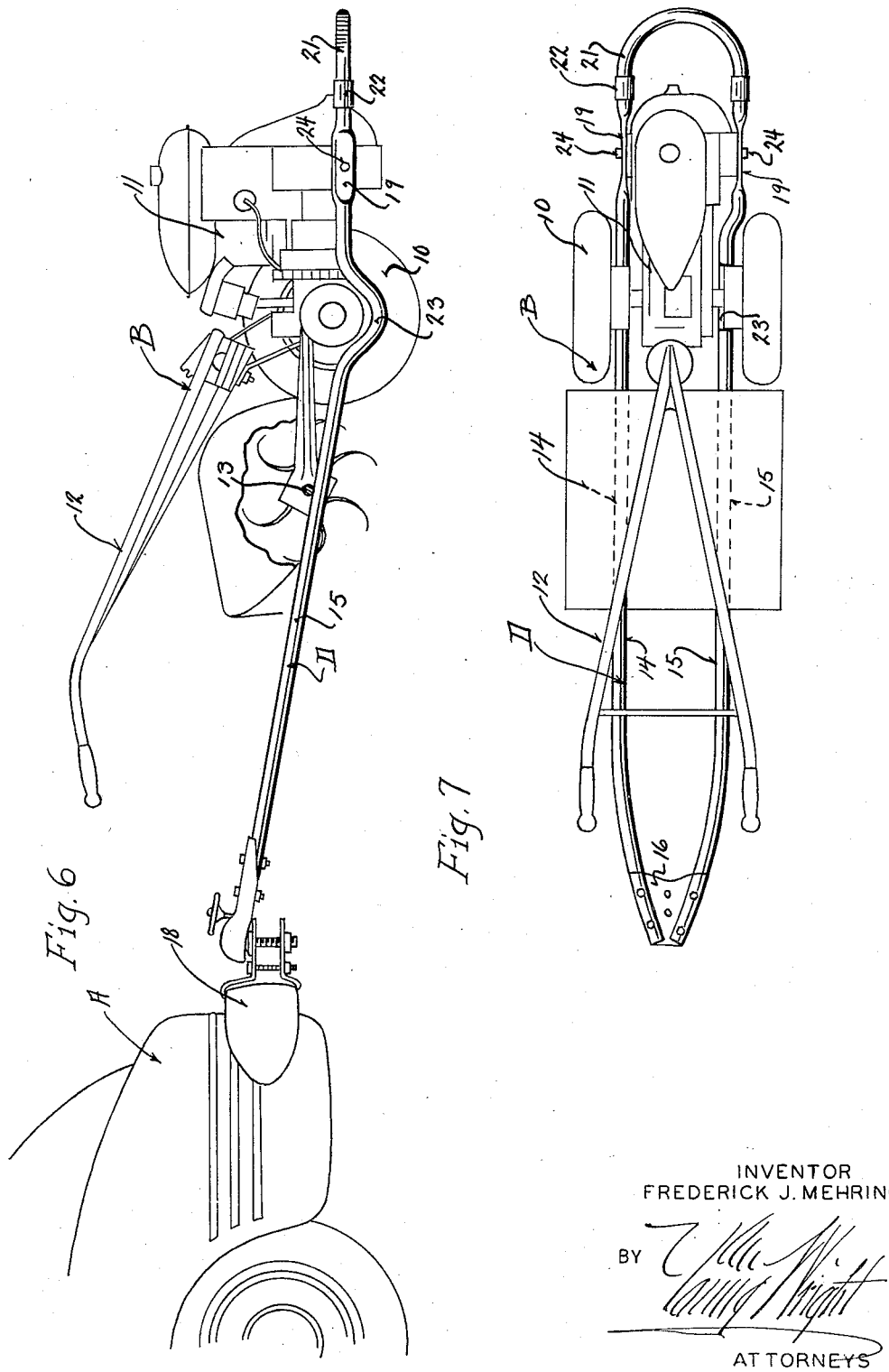
INVENTOR
FREDERICK J. MEHRING
BY
ATTORNEYS Patented June 12, 1951

2,557,006

UNITED STATES PATENT OFFICE 2,557,006

WALKING TRACTOR OR TILLER HITCH

Frederick J. Mehring, Thiensville, Wis.

Application April 19, 1948, Serial No. 21,770

3 Claims. (Cl. 280—33.44)

This invention appertains to a tow hitch and more particularly to a novel device for towing a two-wheeled walking tractor or tiller from a pulling vehicle, such as an automobile.

Much difficulty has been experienced in transporting two-wheeled tractors, tillers and the like from place to place. It is now customary to place tillers and tractors of this type in trailers or pick-up trucks for transportation. As some of these devices weigh up to 500# and over, the job of placing and removing the same in and out of trucks and trailers is a difficult one and usually it is necessary to brace the tiller against movement incident to the travel of the truck or trailer up and down hills and over rough roadways.

It is, therefore, one of the primary objects of my invention to provide novel means for transporting a two-wheeled tractor or tiller on its own wheels in rear of a towing vehicle, by the use of a yoke or cradle connected directly with the tractor or tiller and to the rear bumper or other convenient part of the towing vehicle, the yoke or cradle in conjunction with the agricultural implement forming, in effect, a cart which can be easily towed.

Another salient object of my invention is to provide a towing device for walking tractors, tillers and the like embodying a cradle yoke adapted to extend under the agricultural implement and attached thereto in such a fashion so as to balance the same just rearward of the center of gravity so that the ground working shaft will rest on the reach bars or shafts of the towing device, the device carrying any preferred type of hitch, coupler, or clamp for connection with the towing vehicle.

A further important object of my invention is to provide a towing device for two-wheeled agricultural implements, which will be durable and efficient in use; one that will be simple and easy to manufacture; one that can be placed upon the market at a low cost; one that can be easily and quickly attached to and removed from the implement, and one which is light in weight and which will occupy a minimum amount of space when in storage.

With these and other objects in view, the invention consists in the novel construction, arrangement and formation of parts, as will be hereinafter more specifically described and claimed and illustrated in the accompanying drawing, in which drawing:

Figure 1 is a top plan view of my novel tow hitch for two-wheeled walking agricultural implements.

Figure 2 is a similar view with the parts of the device dis-assembled.

Figure 3 is a side elevational view of my hitch.

Figure 4 is a side elevational view of the hitch, showing a slightly modified form thereof for use with a particular style or make of rotary tiller.

Figure 5 is an enlarged detail fragmentary side elevational view, showing a clamp, or trailer coupler carried by the forward end of the towing device for connection with a towing vehicle.

Figure 6 is a side elevational view, showing my novel towing device in use and connected with a rotary tiller and a towing vehicle.

Figure 7 is a top plan view showing my towing device connected with a rotary tiller.

Referring to the drawing in detail, wherein similar reference characters designate corresponding parts throughout the several views, the letter D generally indicates my novel towing device for permitting the effective towing of a two-wheeled, walking agricultural implement B, with a towing vehicle, such as an automobile A.

The towing vehicle A can be considered of any preferred make such as, as shown an automobile, a truck, jeep or the like.

The agricultural implement B is generally of the type embodying rubber tired wheels 10, a motor 11, manipulating handles 12, and/or a tiller shaft 13, or other member to balance, such as handle struts, cross member, frame tie piece, etc. The showing of the agricultural implement is conventional and my towing device D can be used with any make, type of two-wheeled walking tractor or tiller. The front end of the implement B is adapted to have various types of agricultural implements connected thereto such as cutter bars and the front of the implement is provided with bolt openings for permitting the connection of cutter bars and the like to said agricultural implement.

Referring more particularly to my novel towing device D, the same includes a pair of forwardly extending reach bars or shafts 14 and 15. These bars 14 and 15 can be made from any preferred type of material, but I desire to make the same of tubes for the sake of lightness. The forward ends of the bars or shafts 14 and 15 are bent inwardly in converging relation and have bolted or otherwise secured thereto an attaching plate 16, to which is bolted or otherwise fastened any desired type of hitch, trailer coupler, or clamp 17 for connection with the rear bumper bar 18 of the towing vehicle. As any preferred type of hitch or coupler now found on the open market can be used, the hitch or coupler illustrated can be considered as a conventional showing. In Figure 5 one type of coupler 17 is shown and in Figure 6 another type of coupler or hitch is shown. The hitch or coupler illustrated in Figure 5 is of the type now commonly used for connecting service motorcycles with automobiles.

As is clearly shown in Figure 3, the reach bars or shafts 14 and 15 are slightly bowed downwardly intermediate their ends for facilitating the placing of my novel device under the agricultural implement to be transported. The bars 14 and 15 adjacent to their rear ends are flattened as at 19, so that these parts can lie flat against the opposite sides of the agricultural implement B, adjacent to the forward end thereof and these flattened portions are provided with bolt holes 20, for a purpose which will be later set forth.

In order to add rigidity to my towing device and to provide a bumper bar, the rear ends of the bars 14 and 15 are connected by a transverse bar 21, which also can be formed from a length of tubing. This transverse bar 21 can be connected to the rear ends of the bars or shafts 14 and 15 by means of threaded cuffs 22.

With the form of agricultural implement B shown in Figure 6, the bars 14 and 15, just forwardly of the flattened portions 19, are provided with depending arcuate portions 23, so that the bars or shafts 14 and 15 can extend, under the hubs of the wheels 10 of the agricultural implement B.

In use of my novel towing device, the agricultural implement is placed so that the handles 12 thereof will face the towing vehicle and the towing device D is then placed under the agricultural implement B. Cap screws or the like 24 are now placed through the bolt holes 20 and are threaded into the openings formed in the fan housing of the agricultural implement until the flattened portions 19 of the bars 14 and 15 are drawn tight against opposite sides of the agricultural implement. As heretofore brought out, the openings in the fan housing are usually employed for permitting the connection of cutter bars and the like to the agricultural implement B, hence no new bolt holes have to be made in the implement B. The towing device is now connected by the hitch or coupler to the vehicle A and the implement B can now be readily towed in the rear of the vehicle to any desired place.

Particular attention is invited to the fact that the towing device D is connected to the implement B just rearward of the center of gravity of the implement B and consequently the shaft 13 will rest directly on the bars or shafts 14 and 15 of my towing device. The towing device in conjunction with the implement B forms in effect a cart and the implement B is towed on its own wheels 10.

The pneumatic tires of the implement B plus the slightly arched frame of the towing device act as shock absorbers to smooth the ride of the implement over roadways and fields.

From the foregoing, it can be seen that I have provided an exceptionally simple and durable device for permitting the towing of a two-wheeled walking cultivator, tiller and the like in the rear of a towing vehicle and on the wheels of the implement B. The driver of the towing vehicle can easily observe, by looking into the rear view mirror, how the agricultural implement B is riding and in fact, the handles 12 of the implement B can always be seen in the rear view mirror.

In view of the fact that my towing device is of a light weight, the same can be handled easily and when the same is not in use, the towing device D can be set upright in a corner or any other convenient place, or hung up between upright studs in a garage or shed on a hook or nail.

In the drawing, I have illustrated a certain make of rotary tiller, in other makes of walking tractors, the motors are usually mounted forwardly. In such cases, the tow hitch would then be reversed in relation to the motor and would extend from the front, fastened either front and rest on rear portion, or fastened rear and rest on front cross member. In still other cases, both front and rear of walking tractor would be fastened by bolts through the flattened portions 19, on reach bars 14 and 15, and flattened or attached plate boss or welded hook at point just forward of center of balance, to take advantage of arched reach bars for riding control. The object is to carry some weight on the tow hitch at its center lengthwise, and contact is made approximately equal distance from either side of the axle of the tractor. In some instances, I can utilize a single tube or reach bar instead of a double reach bar, as shown in the drawings.

Changes in details may be made without departing from the spirit or the scope of my invention, but what I claim as new is:

1. The combination with a two-wheeled walking agricultural implement including ground wheels, manipulating handles, a tiller shaft and a fan housing adjacent to its forward end, said fan housing being provided with bolt openings on its opposite sides, of a towing device for the implement comprising a frame disposed under the wheels and tiller shaft of the implement, said frame including a pair of forwardly extending reach bars, a hitch plate connecting the forward ends of the reach bars together, the rear ends of said reach bars being provided with flattened portions for engaging against the opposite sides of the fan housing provided with bolt holes registering with the bolt holes in the fan housing and bolts extending through the bolt holes in the flattened portions and into the bolt holes of the fan housing.

2. The combination with a two-wheeled walking agricultural implement including ground wheels, manipulating handles, a tiller shaft and a fan housing adjacent to its forward end, said fan housing being provided with bolt openings on its opposite sides, of a towing device for the implement comprising a frame disposed under the wheels and tiller shaft of the implement, said frame including a pair of forwardly extending reach bars, a hitch plate connecting the forward ends of the reach bars together, the rear ends of said reach bars being provided with flattened portions for engaging against the opposite sides of the fan housing provided with bolt holes registering with the bolt holes in the fan housing and bolts extending through the bolt holes in the flattened portions and into the bolt holes of the fan housing, said reach bars adjacent to their rear ends being flattened for engagement with the opposite sides of the agricultural implement.

3. The combination with a two wheeled walking agricultural implement including ground wheels, manipulating handles, a tiller shaft on one side of the ground wheels and a fan housing on the other side of the ground wheels and adjacent to the forward end of the implement, said fan housing being provided with bolt openings on its opposite sides, of a towing device for the implement comprising a frame including a pair of reach bars converging toward their forward ends, said reach bars extending under a part of the implement and said reach bars engaging the fan housing and having bolt openings therein registering with the bolt holes in the fan housing, bolts extending through the bolt holes of the reach bars and into the bolt holes of the fan housing, and a hitch carried by the forward ends of the reach bars for connection with a towing vehicle.

FREDERICK J. MEHRING.

REFERENCES CITED

The following references are of record in the file of this patent:

UNITED STATES PATENTS

| Number | Name | Date |
|---|---|---|
| 1,485,509 | Kohler | Mar. 4, 1924 |
| 1,860,518 | Wells | May 31, 1932 |
| 2,283,716 | Zalimeni | May 19, 1942 |
| 2,348,741 | Jessen | May 16, 1944 |